Oct. 1, 1968

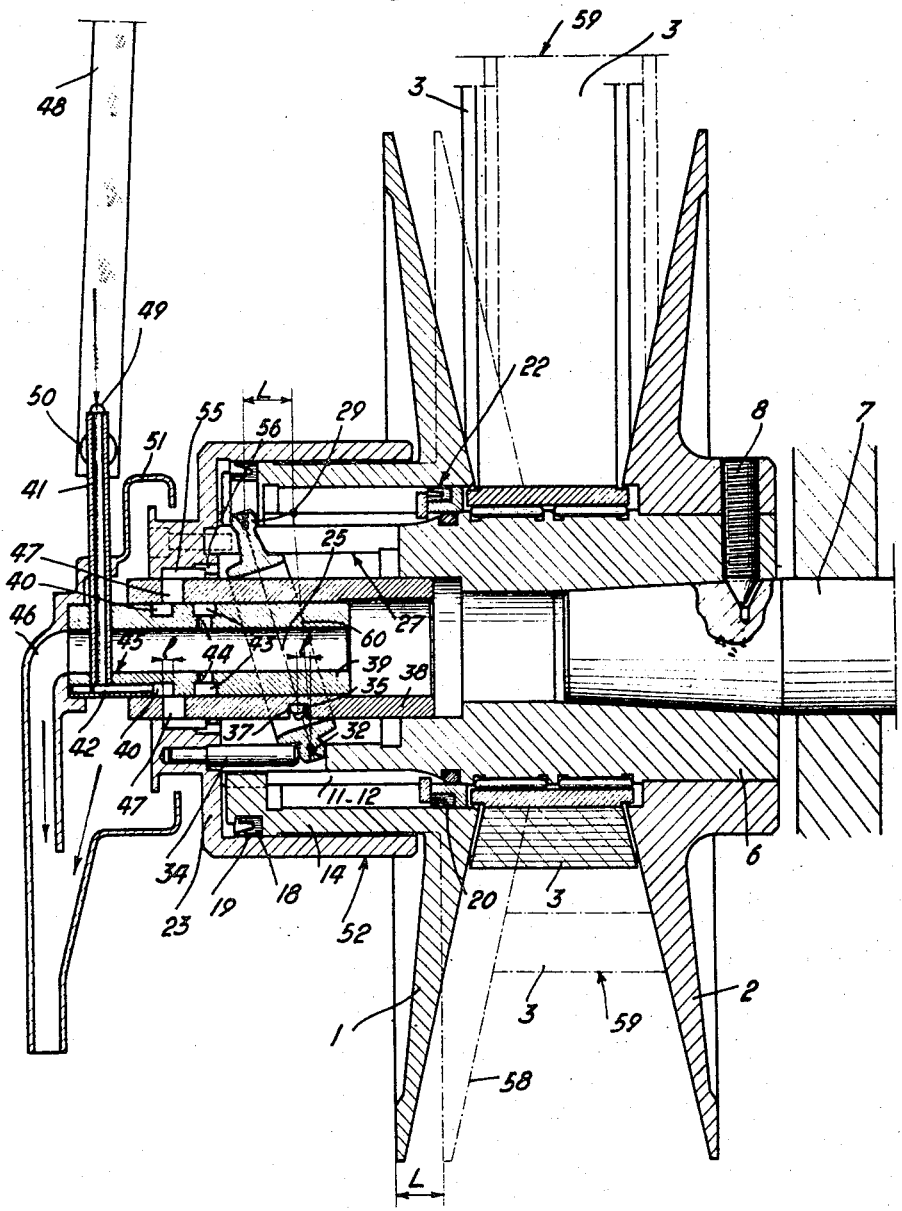

H. R. BRUET 3,403,567

V-BELT SPEED-CHANGING MECHANISMS OPERATED
BY LIQUID UNDER PRESSURE

Filed Aug. 24, 1965

H. R. BRUET 3,403,567

V-BELT SPEED-CHANGING MECHANISMS OPERATED
BY LIQUID UNDER PRESSURE

Filed Aug. 24, 1965

Oct. 1, 1968 H. R. BRUET 3,403,567
V-BELT SPEED-CHANGING MECHANISMS OPERATED
BY LIQUID UNDER PRESSURE
Fig. 17
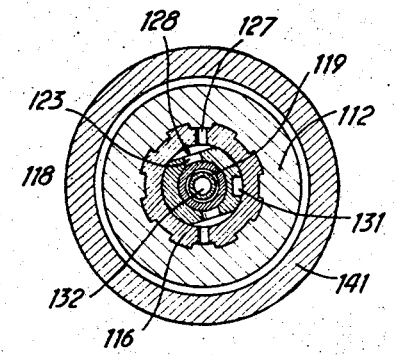
Fig. 19
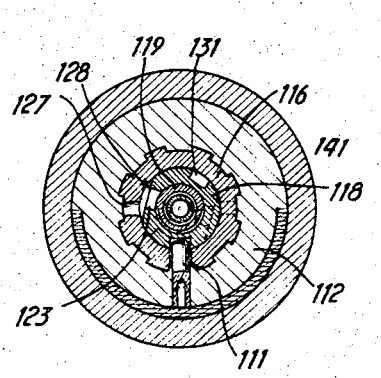
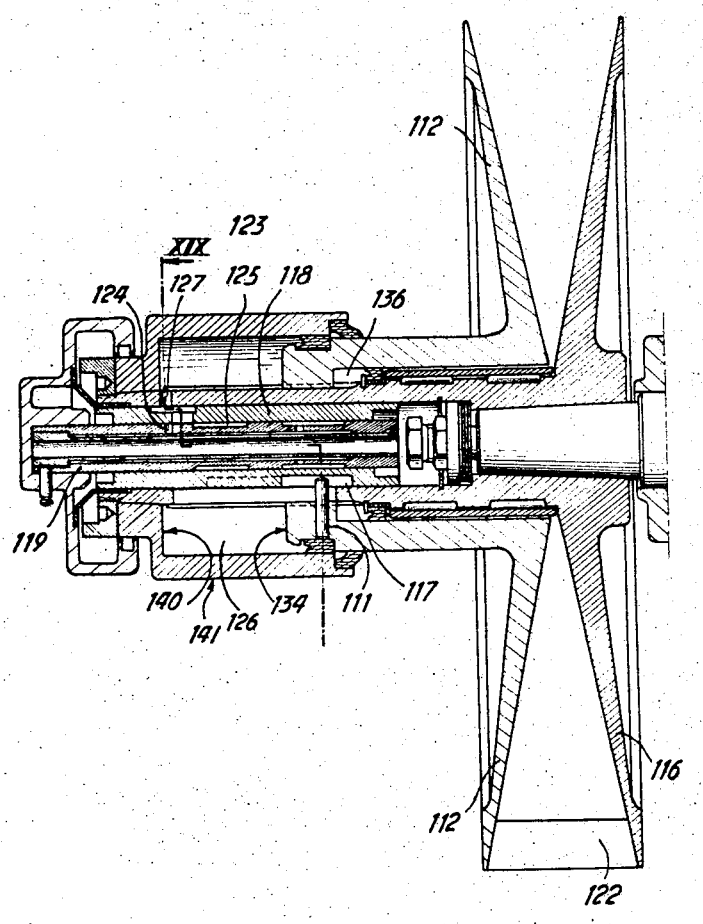
Fig. 18

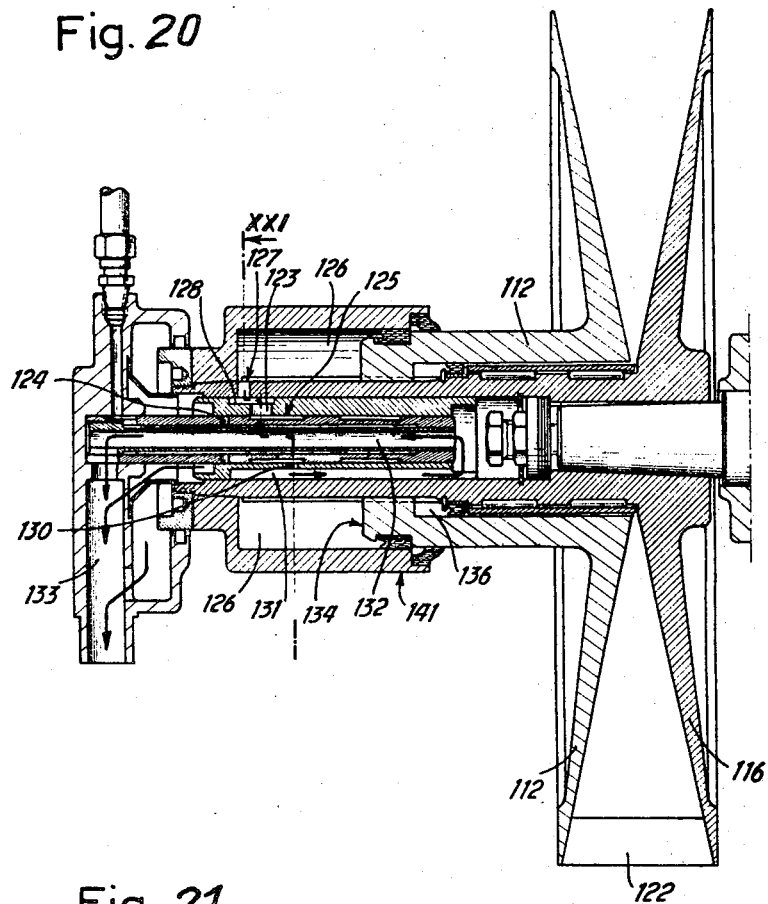
Fig. 20
Fig. 21
Fig. 24
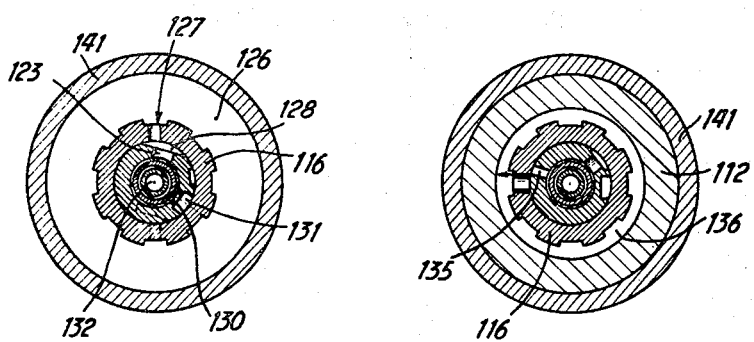

United States Patent Office 3,403,567
Patented Oct. 1, 1968

3,403,567
V-BELT SPEED-CHANGING MECHANISMS OPERATED BY LIQUID UNDER PRESSURE
Henri René Bruet, Paris, France, assignor of one-half to Etablissements A. Cazeneuve, La Plaine-Saint-Denis, France, a French company
Filed Aug. 24, 1965, Ser. No. 482,201
Claims priority, application France, Aug. 26, 1964, 986,301
17 Claims. (Cl. 74—230.17)

ABSTRACT OF THE DISCLOSURE

A flange of the driving pulley may be shifted axially into and out of engagement with the belt, and locked out of engagement, by pressurised fluid allowed to flow into and out of two oppositely disposed and oppositely operating chambers by a control pilot valve, and said flange while being out of engagement with said belt may be axially shifted farther from the belt and back to its said locking position by said fluid in said chambers selectively to cause engagement and disengagement of another coaxially disposed and axially movable driving pulley flange with another V-belt.

---

This invention relates to improvements in speed-changing mechanisms of the type comprising a V-belt which passes over pulleys having conical flanges, wherein at least one of said flanges is axially displaceable under the action of a liquid under pressure which is caused to produce action within a cavity of the hub by a distributor which is controlled in dependence on said movable flange. The chief aim of the invention is to improve the controlled operation of the distributor in dependence on the movable pulley-flange. Further improvements are concerned with an advantageous arrangement of the keys for driving the pulley flanges as well as with a combination of means which provide the possibility of isolating the set of pulleys from the driving portion.

Pulleys are already known in which the distributor is disposed within the hub itself of the pulley and concentrically therewith, while in other designs, said distributor is disposed outside the pulley.

In the first case, the travel of the distributor is equal to that of the movable flange. The overall lengthwise dimension which is in that case substantial and the considerable overhang which results are prohibitive in certain applications by reason of the overall dimension referred-to as well as the vibrations and potential amplitude of such vibrations which are detrimental both to the effective utilization of the apparatus, its efficient operation and to its service life. Moreover, it is not possible in this arrangement to reduce the winding diameter to a minimum which, in certain cases, is essential in pulleys of small dimensions.

In the second case, it is necessary to establish external connections between the distributor and the slidable rotating portion consisting of the hub of the movable pulley-flange. Lubrication of these connections is a necessary operation which proves both difficult and unreliable, with the result that seizures are liable to occur and to give rise to breakage of components and stoppages of operation.

Furthermore, the two arrangements referred-to do not make it possible to utilize the rotary portion which is integral with the driving shaft for the purpose of initiating auxiliary operations.

The improvements which form the subject of this invention consist of a number of means which are intended to circumvent the disadvantages mentioned above and to introduce novel advantages which ensure accurate and reliable operation in all cases while providing further possibilities of utilization.

In accordance with the invention, the mechanical connection which operates the distributor in dependence on the sliding flange comprises inside the hub a mechanism for stepping down the longitudinal motion of the flange. A mechanism of this type can be designed in a number of different forms of embodiment.

In a first form of embodiment, said mechanism consists of a lever which can be of the first order but is preferably of the second order and which extends on each side of the geometrical axis of the pulley, thereby permitting the possibility of balancing said pulley in a suitable manner.

In a second form of embodiment, the step-down mechanism consists of a stud and groove coupling between the sliding flange of the pulley and the distributor component which is controlled by said flange.

A certain number of other characteristic arrangements will become apparent in the complementary description which follows below in reference to the accompanying drawings, said description and drawings being given solely by way of example and not in any limiting sense.

In accordance with one of the arrangements referred-to, a second pressurized-fluid chamber is formed inside the hub. The admission and discharge of fluid under pressure into and from said chamber are controlled by distributor means which are associated with those of the oppositely-acting chamber and which are operated in dependence on the position of said movable flange in such a manner as to be capable of coming into action only when the distance between the flanges is such that the V-belt bears on the bottom of the pulley groove, said groove bottom being preferably constituted by an idler pulley.

The second chamber referred-to can serve for a number of different objects which can be combined or not with each other. One of these objects is to eliminate any rubbing of the lateral faces of the driving belt against the flanges of the pulley and therefore to effect the complete disengagement of said driving belt, in which case a piston housed within said second chamber is coupled to the movable flange of the driving pulley so as to exert on said flange a thrust in the direction of outward displacement of the flanges of said pulley in order to increase the distance existing at the time of admission of fluid under pressure within said chamber.

A further object of the invention, which is preferably employed in combination with the preceding, consists in effecting the longitudinal displacement of a movable flange of a second pulley having a V-section groove and mounted on the driving shaft, in which case a piston housed in said second chamber is coupled to said movable flange of said second pulley in such a manner as to be capable of exerting on said flange a thrust which tends to draw the two flanges of said second pulley towards each other.

One particular application of the arrangement last mentioned consists in coupling both pulleys to a same driven shaft of a machine-tool or even of the transmission shaft of a vehicle, in such a manner that said pulleys can drive said shaft in opposite directions. There is thus provided a forward and reverse mechanism which also permits of speed variation in forward motion with reverse motion.

In the attached drawings:

FIGS. 1, 3 and 4 show in axial cross-section a number of different operating positions of a driving pulley, the control system of which comprises a step-down or motion reduction lever;

FIGS. 14, 15, 16, and 17 are longitudinal and transverse cross-sections of the driving pulley of a speed-changing mechanism with conical flanges which are at their maximum distance apart in the belt-disengagement position;

FIGS. 18 and 19 are cross-sections of the driving pulley of the same speed-changing mechanism in which the conical flanges are in their position of maximum closure;

FIGS. 20, 21, 22, 23 and 24 are longitudinal and transverse cross-sections of the driving pulley of the same speed-changing mechanism in different positions in which said mechanism is permitted to follow the control of speeds, the engagement of an auxiliary driving belt and disengagement in which the flanges are separated.

Figure 25:
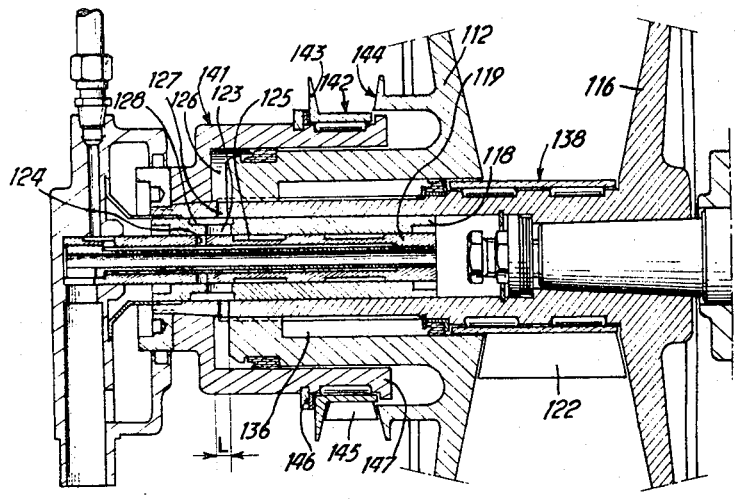
Figure 26:
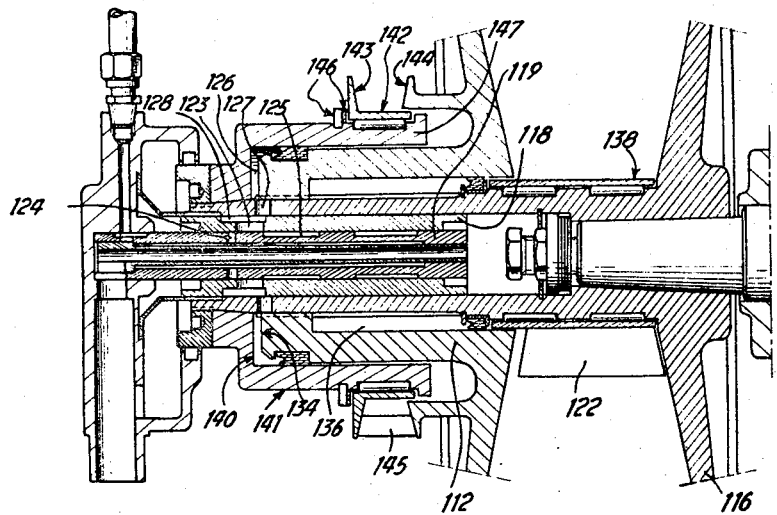

FIGS. 25 and 26 are views in longitudinal cross-section of an alternative form in which the speed-changing mechanism is provided with an auxiliary control system.

Figure 1:
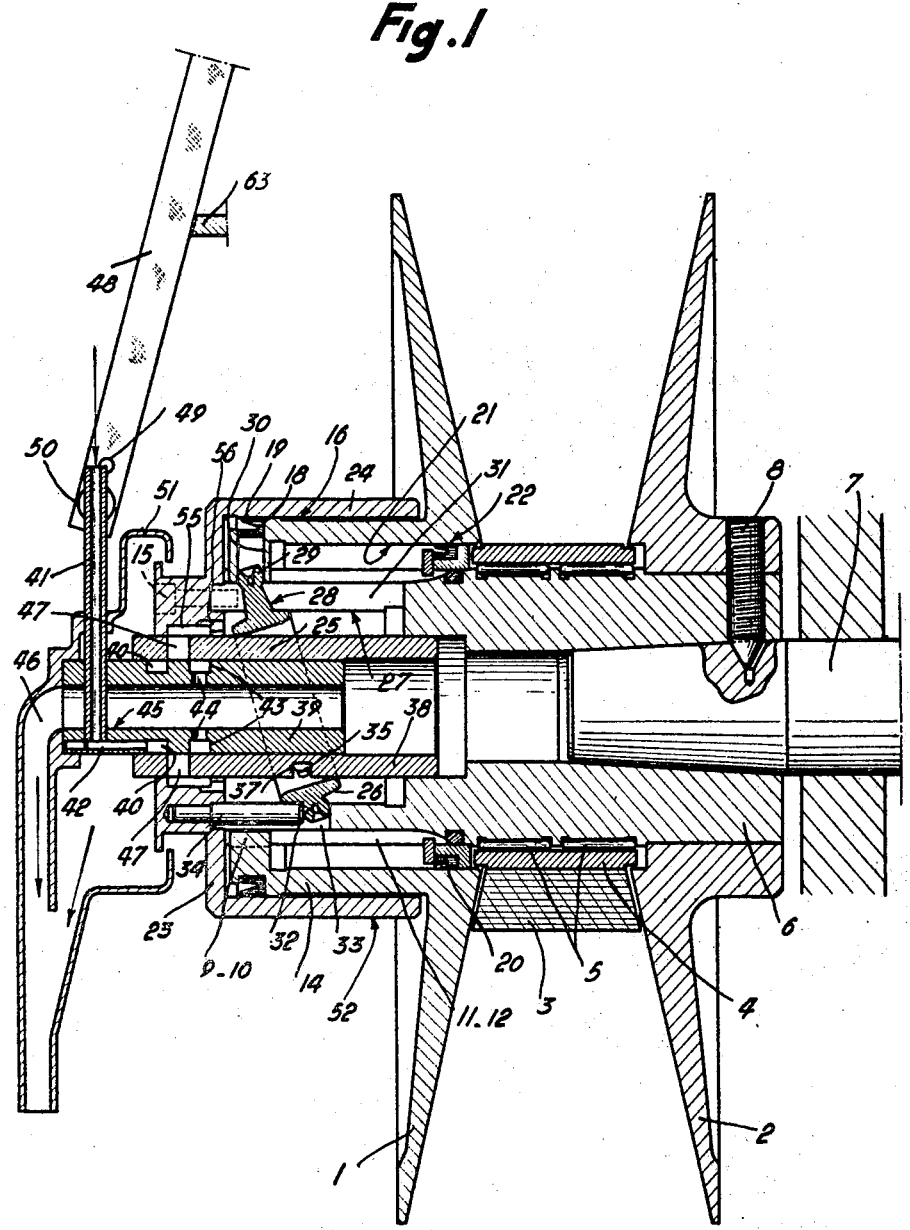

FIG. 1 shows the flanges 1 and 2 of the driving pulley in the position corresponding to maximum separation of said flanges. It can be seen that the V-belt 3 is wound around the ring 4 which is mounted on roller-bearings 5 carried by the hub 6 on which is centered the fixed flange 2, said fixed flange being made integral with the driving shaft 7 together with the hub 6 by means of screws such as the screw 8.

The hub 6 is provided with lands and grooves 9 and 10 into which engage the corresponding lands and grooves 11 and 12 provided at the extremity of the hub 14 of the movable flange 1.

There is centered and fixed on the extremity of the hub 6 by means of screws such as the screw 15 a cylinder 24 having a bore 16 and a base 23 in which the hub 14 of the movable flange is capable of moving. A sealing ring 18 is fitted in the end of the hub 14 and the lip 19 of said sealing ring is adapted to slide over the cylinder 16. A second sealing ring 20 which is mounted on the hub 6 is applied by means of its lip 22 against the inner wall of the cylinder 21 which is formed inside the hub 14 of the movable pulley 1.

There is thus formed an annular piston, the width of which is determined by the difference between the diameters of the sealing joints 18 and 20 and to which the thrust exerted by the liquid under pressure will be applied.

A lever having an axis 25 and a spherical body 26 is swingably mounted within a bore 27 provided within the hub 6. The arm 28 which forms an extension of said lever carries a spherical head or ball 29 which is adapted to fit with slight friction within a bore 30 machined in the hub 14. A slot 31 which is milled in the hub 6 provides a passageway for the arm 28 and therefore also for the lever having an axis 25. Said lever carries a ball 32 which is axially opposite to the ball 29 and which fits between the base 33 of a groove which is equal to the diameter of said ball and the end of a rod 34 which is force-fitted within the base 23 of the cylinder 24. Two ball-headed studs 35 and 36 are placed within a groove 37 having a width equal to their diameter and milled in the slide-valve 38 in which the distributor piston 39 is slidably fitted. The slide-valve 38 centered at the ends thereof, namely on the right hand side on the hub 6 and on the left hand side on the base 23 of the cylinder 24.

The distributor piston 39 is provided with a circular groove 40 into which the liquid under pressure is admitted by way of the passage 42 and pipe 41, and with a circular groove 43 for discharging the liquid through the ports 44 which open into the bore 45, said bore being connected to the pipe 46 which directs the discharged liquid towards the storage tank (not shown in the drawings).

The admission groove 40 and discharge groove 43 are separated by a width of cylinder equal to or practically equal to the diameter of the ports 47 which are pierced in the slide-valve 38 and which serve in alternate sequence for the admission and discharge of liquid under pressure.

A lever 48 which is pivoted at 49 actuates by means of a sliding member 50 the rigid tube 41 which is connected by means of a hose or the like (not shown) to the source of liquid under pressure (see FIGS. 1, 3, 4 and 5).

In order to limit leakages of fluid under pressure, clearances between the working parts and fluid distributors are reduced to a minimum which is compatible with good operation.

The liquid which may escape is in all cases collected within a channel 51 into which it is projected so as to be directed towards the storage tank (not shown).

The exterior 52 of the cylinder 16 is free and can serve as a pulley for an auxiliary drive.

The operation is as follows:

The driving portion 7 drives in rotation the driving pulley as a whole. Only the distributor piston 39 does not take part in the movement of rotation since it is coupled to the operating lever 48 by means of the sliding member 50.

In the position of FIG. 1, the oprating lever 48 has been swung back to its end position on the right hand side and the flanges 1 and 2 are accordingly located at their maximum distance apart. This distance will preferably be greater by a sufficient quantity than the width of the driving belt 3 which is wound around the cylindrical pulley 4, said cylindrical pulley being carried by roller-bearing 5 on the hub 6. The driving portion 7 is thus isolated from the driving pulley and driven pulley (which has not been shown in the drawings). Disengagement is thus obtained.

When the lever 48 is swung over towards the left hand side as shown in FIG. 3, the distributor piston 39 is accordingly moved towards the right side by means of the sliding member 50 and pipe 41, with the result that the ports 47 are unmasked by a distance $l$ and permit the entry of the liquid under pressure which is admitted through the passageway 42 into the counterbore 55 and flows, by virtue of apertures such as the aperture 56, into the enclosed space which is limited and ensured by means of the sealing joints 18 and 20. The said liquid then exerts a thrust on the annular piston which is constituted by the hub 14 of the movable flange 1 which slides towards the right hand side and compresses the driving belt 3. Under the pressure thus applied, the winding diameter of the belt increases as this latter moves up along the opposite conical surfaces of the flanges 1 and 2 which form the driving pulley.

It is established that, when the ports of the distributor piston have opened by a distance $l$, the movable flange 1 moves by a distance L and comes into position at 58, thus moving the belt 3 to 59 (as shown in chain-dotted lines in FIG. 3). During this movement, the hub 14 of the movable flange 1 has drawn with it the spherical head 29 of the lever having an axis 25 which has performed a swinging motion about the ball 32. Said lever having an axis 25 thus moves its axis to 60 and causes the slide-valve 38 to move towards the right by means of the ball-headed studs 35 over a distance *l* to a position which is similar to that shown in FIG. 1 with respect to the distributor piston 39 and in which said slide-valve 38 obturates the groove 40 and consequently prevents admission of oil under pressure.

Figure 2:
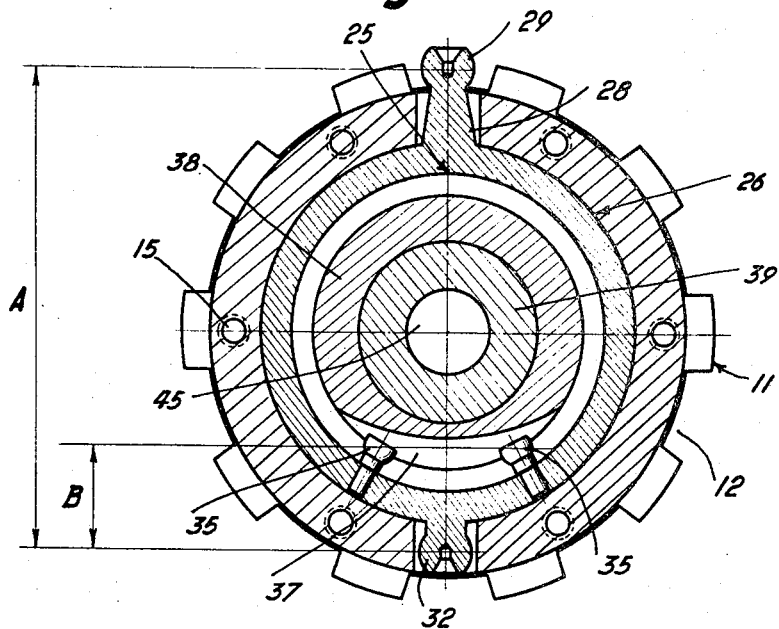
FIG. 2 is a transverse cross-section of the hub of the driving pulley in central alignment with the step-down lever.

These different movements of the movable pulley 1 and distributor piston 39 are obtained by virtue of the step-down lever 25, the arms of which produce action at A and B (as shown in FIG. 2) in position 60 and determine the motion-reduction distance *l*. The result thereby achieved, among others, is a very advantageous and substantial reduction in overall width of the driving pulley.

The movable flange 1 is thus immobilized in position 58 and the driving belt 3 is maintained at its new winding radius 59, this being effected automatically since any displacement which is produced as a result of leakages and of pressure exerted by the lateral faces of the driving belt 3 and which tends to move the movable flange 1 away from the fixed flange 2 has the effect of moving the step-down lever having an axis 25 towards the left. Said lever will then produce immediate action on the slide-valve 38 and thus cause this latter to slide towards the left by a distance which is sufficient to ensure that the ports 47 uncover the groove 40, thereby admitting liquid under pressure and causing the movable flange 1 to move back to position 58 and the driving belt 3 to position 59. These changes of position are very small and the winding of the driving belt 3 is determined by the position of the lever 48 in an invariable manner, thus maintaining a definite and stable transmission of motion. By moving the lever 48, there can be obtained in the same manner all the positions of the movable flange 1 and consequently of the driving belt 3 from the minimum-radius winding as shown in FIG. 1 to the maximum-radius winding as shown in FIG. 4 in which the driving belt 3 is located in position 61 and the movable flange 1 in position 62.

During this controlled operation, the lever 48 is swung over from its stop 63 on the far right hand side to the stop 64 at the far left.

Figure 4:
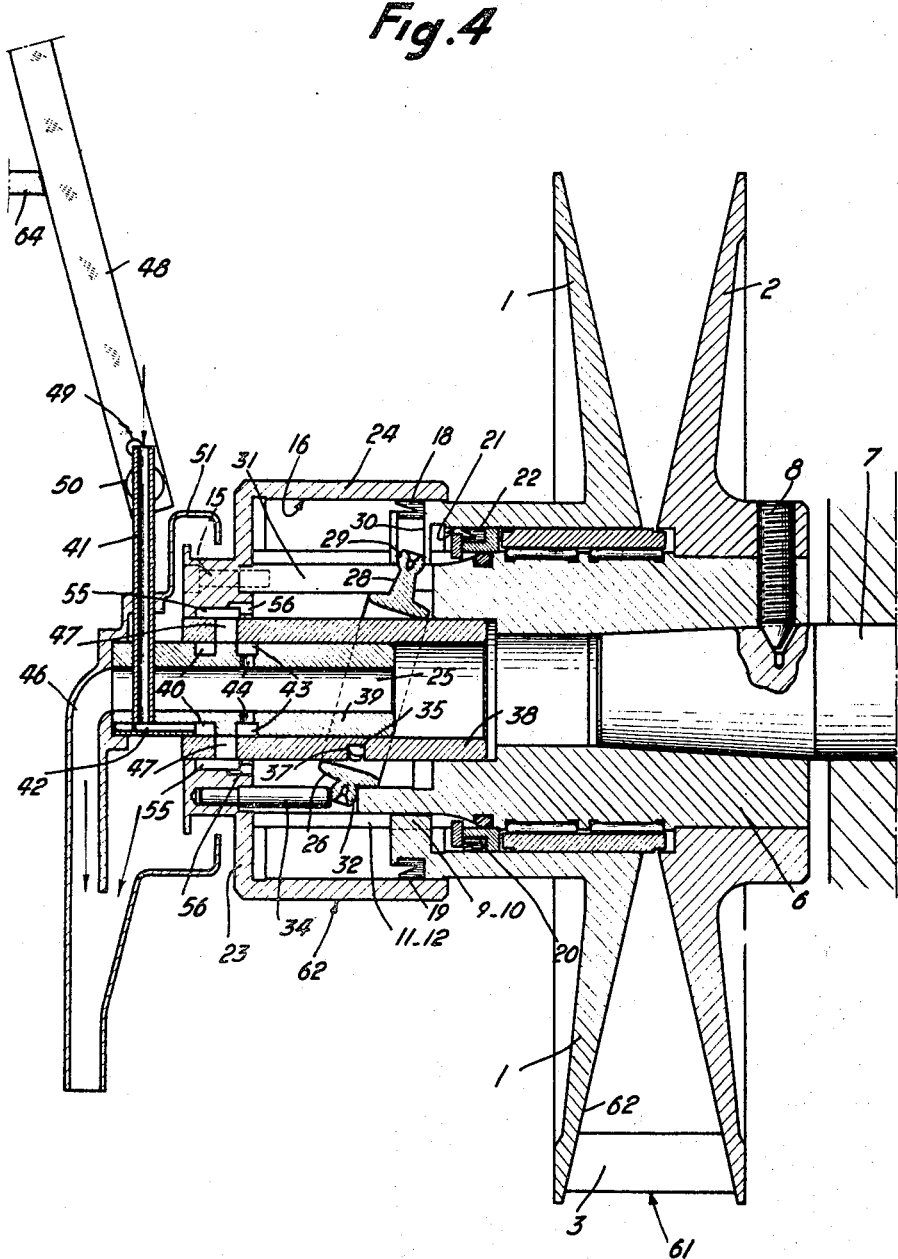
Figure 5:
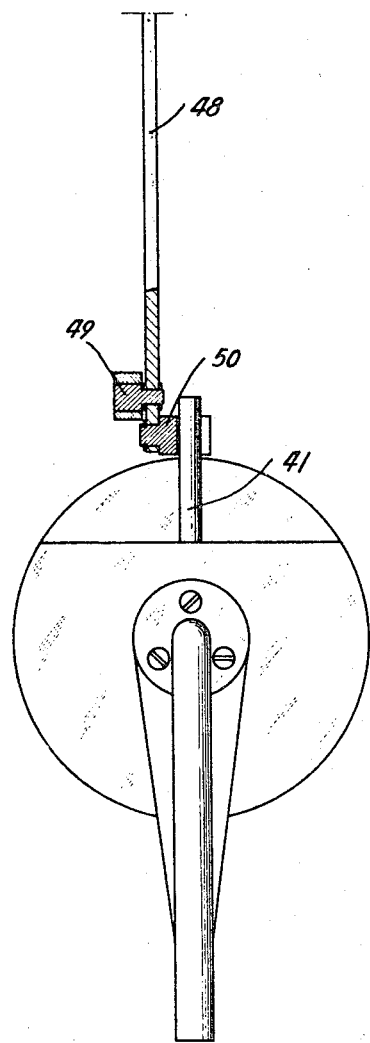
FIG. 5 is a view looking on the end of the distributor control system.

Conversely, when the operating lever 48 is moved from its position against the stop 64 as shown in FIG. 4 towards the right hand side, the distributor piston 39 is displaced towards the left, with the result that the groove 43 unmasks the ports 47 of the slide-valve 38 and that the liquid contained between the cylinder 16 and the hub 6 is driven back by the annular piston which is constituted by the hub 14 of the movable pulley 1. The reaction of the lateral faces of the driving belt 3 against the conical face which results from the tractive force exerted on the movable pulley by the driven pulley (not shown) thrusts said movable pulley towards the left so as to produce a reduction in the diameter of winding of the driving belt over the driving pulley.

During its movement towards the left, the hub 14 drives the lever having an axis 25 by means of the spherical head 29 and consequently the slide-valve 38 is displaced towards the left by the ball-headed studs 35 so that, when the distributor piston 39 is stopped in a selected position, the slide-valve 38 accordingly closes off the groove 43, thereby stopping the discharge of liquid and arresting the movable flange 1 in the position corresponding to that of the distributor slide-valve 39 and consequently to the position of the lever 48.

The same applies in all the positions taken up by the lever 48 from the left hand side to the right hand side and in which the movable flange 1 will move from the position shown in FIG. 4 to that shown in FIG. 1 whilst the driving belt 3 will move from the maximum winding radius to the minimum winding radius in the disengaged position.

In this form of embodiment, the step-down lever is of the second order. However, it would not constitute a departure from the scope of this invention if said lever were replaced by a lever of the first order which would accordingly be supported on a sleeve mounted within the hub and traversed by said lever; such a lever would in that case be entirely situated on one side of the geometrical axis of the pulley.

Further, it will be appreciated from the foregoing that said members 38 and 39 provide a control pilot valve of which member 39 is the control pilot member and member 38 the pilot following member as is the valve described in applicant's prior U.S. Patent No. 3,014,378.

Figure 6:
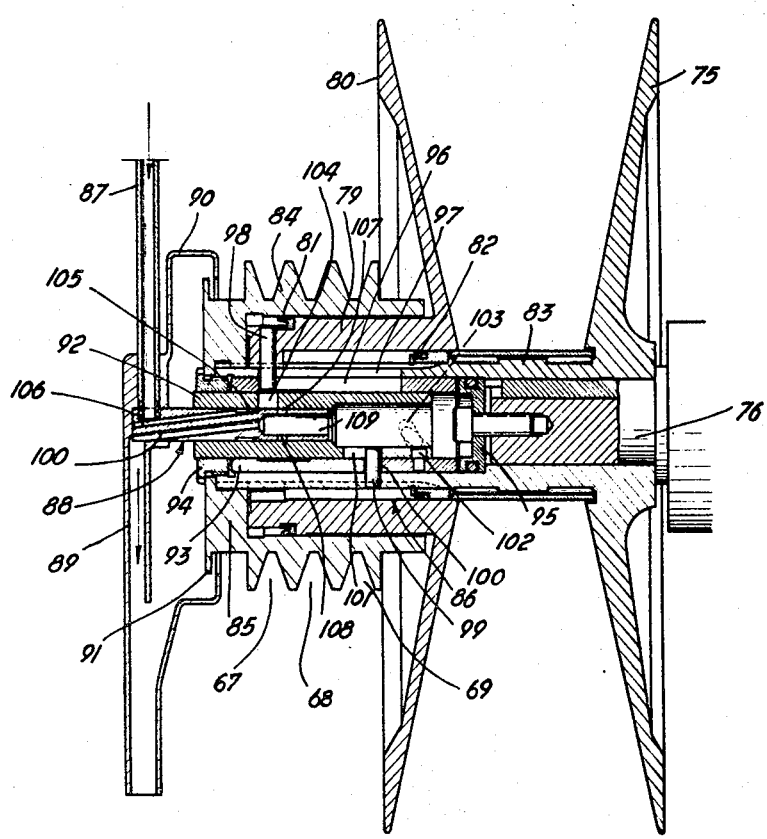
FIGS. 6, 8 and 8a show in longitudinal cross-section a number of different operating positions of a driving pulley, the control system of which comprises a step-down mechanism of the helical type.
Figure 8:
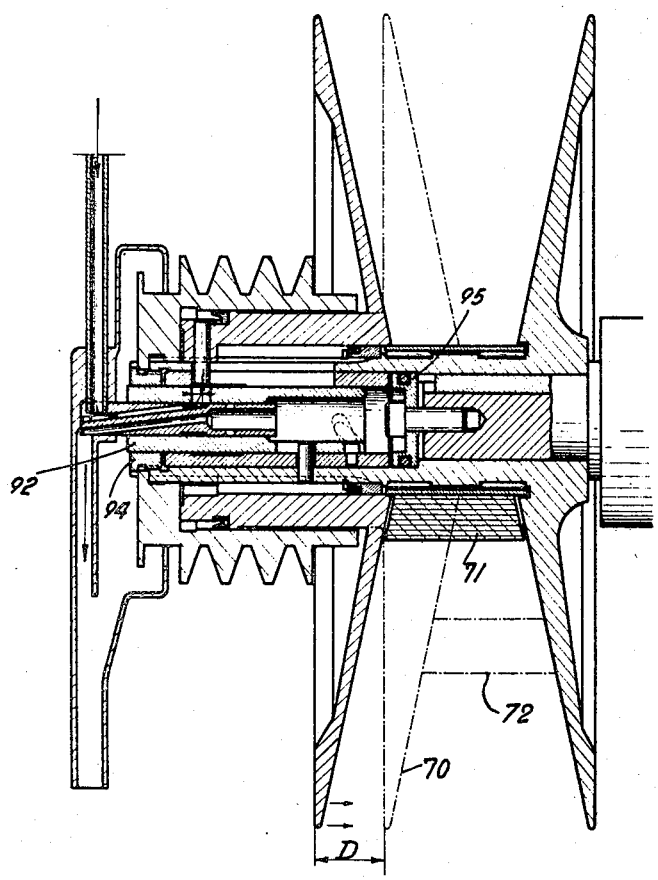
Figure 8A:
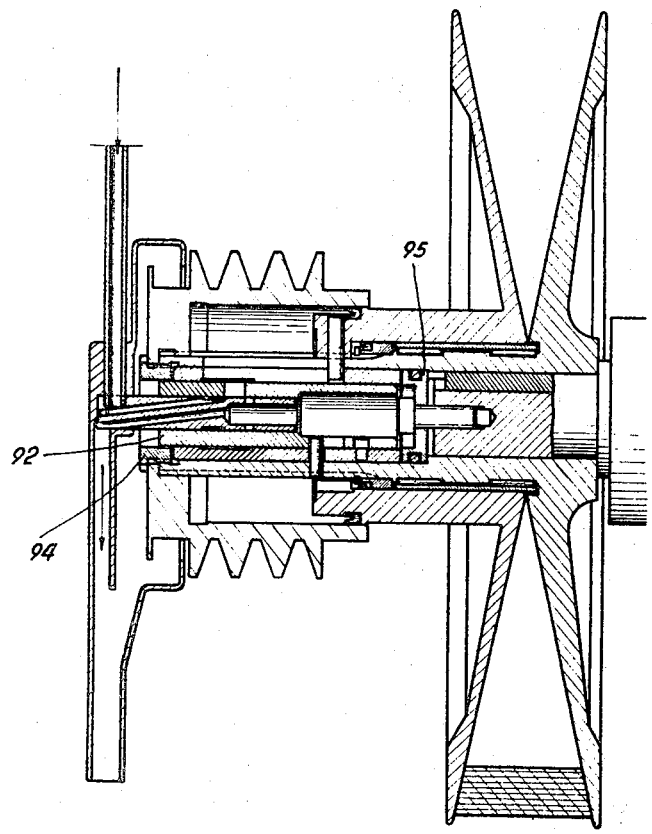
Figure 9:
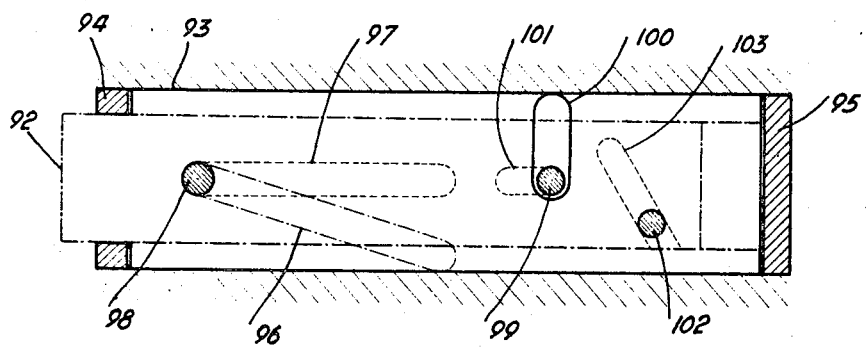
FIGS. 9, 10 and 11 are diagrams showing the slots formed in the assembled members and the paths followed by the studs which guide or actuate said members.
Figure 10:
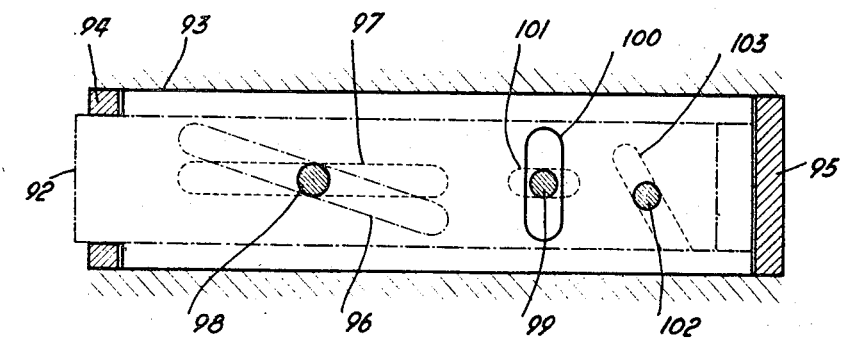
Figure 11:
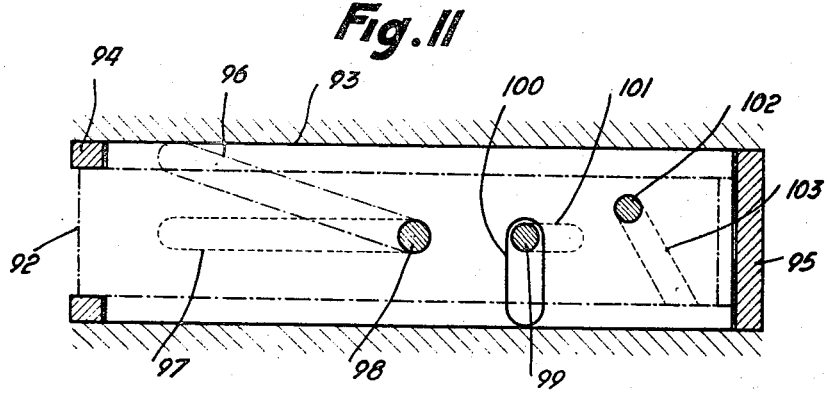

The general arrangement of the driving pulley which is illustrated in FIGS. 6, 8 and 8a is analogous to or the same as that of the driving pulley which has been described above.

Figure 7:
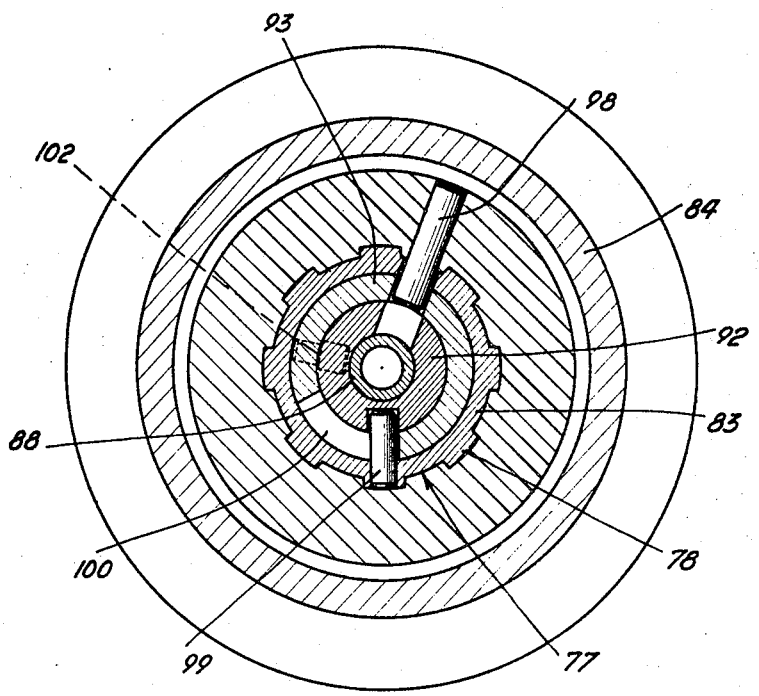
FIG. 7 is a transverse cross-section of the hub of said driving pulley.

The fixed flange 75 is keyed to and maintained on the driving shaft 76 by means of screws. The hub 83 of said flange extends towards the left hand side of the figure and is provided with grooves and lands 77, 78 (as shown in FIG. 7) on which slide corresponding grooves and lands which are machined on the hub 79 of the movable pulley 80. Said hub 80 constitutes an annular piston, the surface of which is delimited by the diameters of the sealing joints 81 and 82. At the end of the hub 83 is centered and fixed a cylinder 84 having a base 85 in which the sealing joint 81 is slidably fitted. The second sealing joint 82 is adapted to slide within the bore 86 provided inside the hub 79 of the movable pulley 80. The liquid under pressure is supplied through the pipe 87 and stops at the distributor piston 88. The discharge of the liquid takes place through the tube 89 and any leakage is collected in the channel 90 in which the deflector 91 is adapted to move. The controlled operation of the distributor piston 88 is similar to the operation which has been described earlier.

The controlled operation of the slide-valve 92 in which the distributor piston 88 is adapted to slide is carried out by means of the tube 93 which, in conjunction with the slide-valve 92, performs the function of a step-down device providing motion reduction between the displacement of the pulley 80 and the displacement of said slide-valve 92. Said tube 93 is centered in the hub 83 of the pulley 75 and is supported longitudinally on the left hand side by means of a nut 94 which retains the base 85 and on the right hand side by means of a centering bridge 95 which serves to lock the flange 75 onto the driving shaft 76. Said step-down tube 93 is provided with a helical groove 96 having a coarse, right hand pitch and the same longitudinal length as the right hand groove 97 formed in the hub 83 of the flange 75. A pin 98 which is force-fitted in the end of the central tubular piston 79 of the movable flange 80 engages within the two grooves 97 and 96.

A second pin 99 which is force-fitted in the hub 83 engages within a slot 100 formed in the tube 93 at right angles to its axis and terminates within a slot 101 which is machined parallel to its axis in the slide-valve 92. A stud 102 is forcibly inserted in the tube 93 and the head of said stud is adapted to fit in the helical groove 103 which is machined in the slide-valve 92. The slide-valve 92 is provided with ports such as the port 104 for the admission and discharge of liquid under pressure. A groove 105 is formed in the distributor slide-valve 88 and a passage 106 opens into said groove for the purpose of discharging into this latter the liquid under pressure which is conveyed through said passage from the pipe 87. At a distance which is at least equal to the width of the ports such as the port 104, provision is made in the distributor piston 88 for a groove 107 pierced by holes 108 having their openings in the bore 109, said bore being extended by the passageway which returns to the discharge pipe 89.

The operation is as follows:

When the distributor piston 88 is displaced towards the right hand side by the same means as those which have been described earlier and over a distance *d*, the liquid under pressure which is derived from the pipe 87 and passageway 106 flows into the cylinder 84 through the ports such as 104 of the slide-valve 92 which are thus unmasked. The annular piston 79 is thrust towards the right and draws with it in its movement the movable pulley 80 which is integral therewith. The result achieved by this movement is that the extremity of the pin 98 which is engaged within the helical groove 96 initiates the anti-clockwise rotation (locking on the end) of the tube 93 in which the stud 102 travels along a part of the helical groove 103, thereby causing the slide-valve 92 to move towards the right. The movement of rotation of the tube 93 and consequently the displacement of the movable flange 80 cease when the stud 102 has travelled a sufficient distance from the helical groove 103 to displace the slide-valve 92 over a distance $d$ (as shown in FIG. 8), thus closing off the ports such as 104 and, by stopping the admission of liquid under pressure, maintains the movable flange 80 in its new position 70 and the driving belt 71 at its new winding radius 72.

As has been indicated earlier, any displacement of the movable flange 80 towards the left would be immediately followed by an opening of the ports 104 with respect to the distributor slide-valve 88, which would be thus initiate an admission of liquid under pressure and bring back the movable flange 80 to its initial position in which said flange would be automatically maintained as long as the distributor piston 88 remains stationary in the position selected.

The same will apply in all positions of the distributor piston 88 referred-to, from the position shown on the far left of FIG. 6 in which the driving belt 71 has its minimum winding radius up to the position thereof which is shown in FIG. 8a on the extreme right in which the driving belt 71 has its maximum winding radius.

The movement of the distributor from the right hand side shown in FIG. 8a to the left hand side shown in FIG. 6 will restore the driving belt 71 from its maximum winding radius to its minimum winding radius.

During this return movement, the slot 107 of the distributor piston 88 moves in front of the ports 104, with the result that the liquid imprisoned within the cylinder 84 flows out through the holes 108 formed in the bore 109 and returns through the passageway 110 and the tube 89 to the liquid storage tank (which has not been shown in the drawings). As soon as the distributor piston 88 comes to a standstill, the stud 102 performs a movement which is reverse to that previously described, thrusts the slide valve 92 towards the left until its obturates the slot 107 and thus stops the discharge of liquid and maintains the movable flange 80 in the new position chosen. The same will apply in all the positions of return of the driving belt 71 to its minimum winding radius.

In this embodiment too, piston 88 and sliding valve-member 92 provide a control pilot valve of which piston 88 is the control pilot member and member 92 the pilot following member.

The arrangements described in connection with the driving pulleys have in particular the very important advantage of reducing to an extreme minimum both the overhang and overall size of the complete assembly. Moreover, said arrangements make it possible without affecting the service life of the drive-shaft bearing to make use of the exterior of the cylinder such as 84 for power take-off means.

Thus, FIGS. 6, 8 and 8a show V-groove pulleys 67, 68 and 69 in which V-velts can be wound for the purpose of operating an oil pump, dynamo, ventilating-fan or any auxiliary unit which may be desired.

Figure 12:
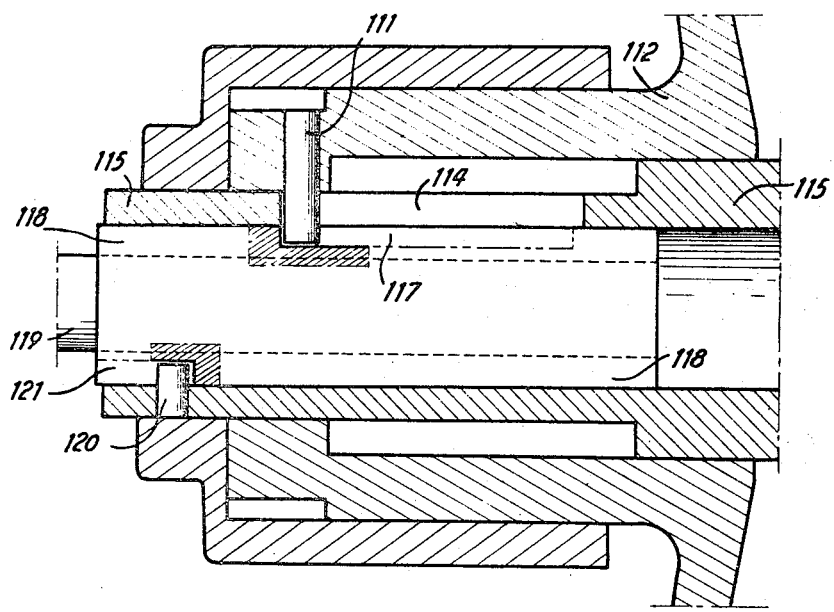
FIGS. 12 and 13 are diagrams which show the slide-valve distributor and its operating pins.
Figure 13:
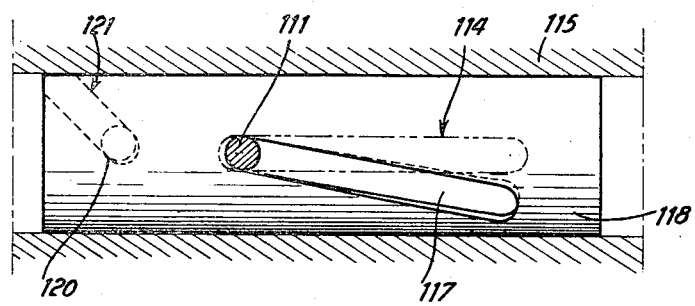

In FIG. 12, a pin 111 is set in the tubular extension which forms an annular piston of the movable flange 112 and passes through a slot 114 which is machined in the barrel 115 forming part of the fixed flange 116 (not shown) and parallel to its axis. Said pin is fitted with slight friction within a blind groove 117 of helical configuration having a pitch P and milled in the sleeve 118 within which the slide-valve 119 is adapted to slide. Another pin 120 is forcibly fitted within the barrel 115 whilst the extremity thereof is designed to engage with slight friction within the blind groove 121 having a helical configuration and a pitch $p$ which is also milled in the sleeve 118. The grooves 117 and 121 are of opposite pitch and, in this example, the groove 117 has a right-hand pitch and the groove 121 has a left-hand pitch. FIG. 13 shows in chain-dotted lines the slot 114 which is parallel to the axis of the barrel 115 and in full lines the helical groove 117 and the cross-section of the pin 111. At the other end of the figure, there can be seen in broken lines the helical groove 121 and the cross-section of the pin 120.

In this arrangement, the controlled operation of the assembled elements is carried out with a minimum of components, namely:

(a) the slide-valve 119 which slides longitudinally within the sleeve 118;
(b) the sleeve 118 which slides longitudinally and rotates within the barrel 115;
(c) the pin 111 which operates angularly the sleeve 118;
(d) the pin 120 against which the sleeve reacts in order to slide longitudinally.

This simplification provides an appreciable reduction:

(e) in working play;
(f) in resistance to motion;
(g) in wear;

thus resulting in considerable smoothness of operation and higher precision in the control mechanism which will retain its initial efficiency over a longer period of time and within narrower limits.

Figure 14:
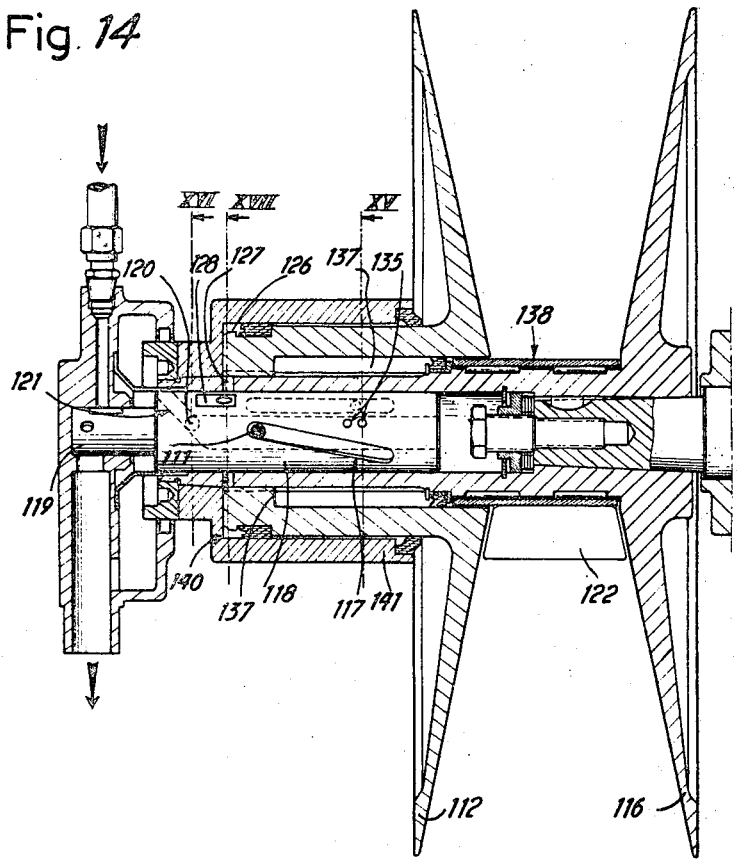
Figure 15:
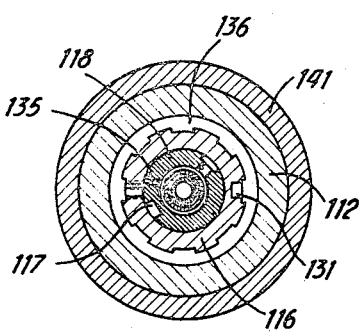
Figure 16:
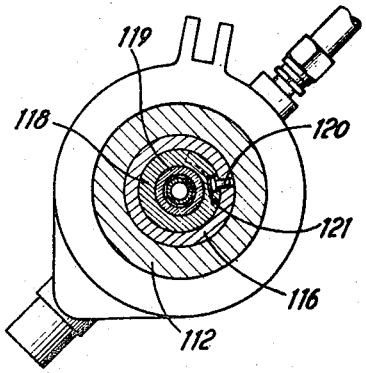

The positions indicated in FIGS. 12 and 13 in the case of the elements referred-to above correspond to those indicated in FIG. 14 and are obtained when the slide-valve 119 is drawn back to its maximum travel on the left hand side, thereby producing maximum separation of the conical flanges, namely the movable flange 112 and fixed flange 116, which form the driving pulley. The V-belt 122 then rests on the freely rotating cylindrical pulley 138 as shown in FIG. 14.

When the slide-valve 119 is located at the limit of travel on the right hand side, complete closure of the flanges 112 and 116 is thus obtained as shown in FIG. 18. The diameter of winding of the driving belt 122 over the driving pulley is then at its maximum and in practice remains stable by virtue of the position of the slide-valve 119 which closes off the port 123. Said port 123 is placed between the port 124, through which the liquid under pressure was admitted so as to produce action on the annular piston constituted by the tubular extension of the movable flange 112, and the annular chamber 125 which is intended to convey the outlet liquid towards the discharge tank.

As long as the slide-valve 119 remains in said position, any displacement of the movable flange towards the left or towards the right will produce a movement of rotation of the sleeve 118 under the action of the pins 111 and 120 within the helical grooves 117 and 121, either in a clockwise or anticlockwise direction, thereby putting the port 123 in communication either with the port 124 through which the liquid under pressure flows towards the cylinder 126 or with the annular chamber 125 which permits the return of the liquid contained within said cylinder 126 towards the discharge tank. From the foregoing, it follows that the movable flange 112 will be stabilized in a mean position and in any case will not be able to move except within extremely close limits.

This equilibrium is obtained in the same manner in all positions which the slide-vale 119 may be caused to take up, thus permitting the possibility of stabilizing the driving belt 122 at all dameters of the driving pulley 112/116 from the minimum diameter which is that of the free-motion pulley 138 to the maximum diameter which is that of the flanges 112 and 116 (as shown in FIGS. 14 and 18).

It will be apparent from the foregoing that there corresponds to a range of travel C of the movable flange 112 a range of travel $c$ of the sleeve 118, C and $c$ being coupled by the relation $c=C\times p/P$, the ratio $p/P$, i.e. the ratio between the pitches of the grooves 121 and 117, constituting the reduction of the range of travel $c$ relative to the range of travel C.

Figure 22:
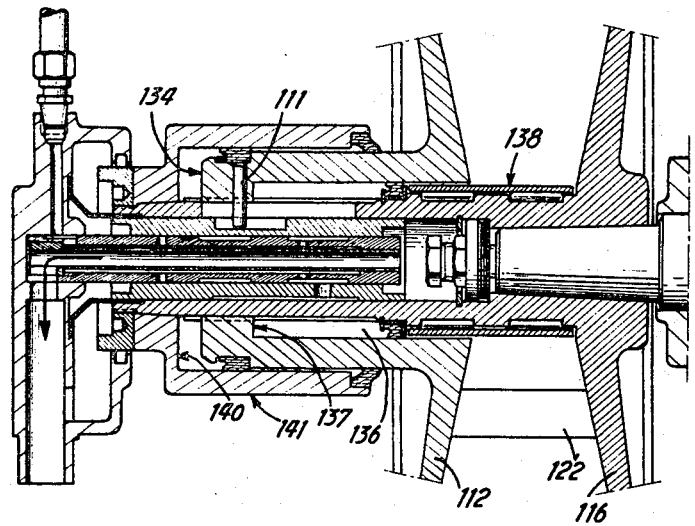
Figure 23:
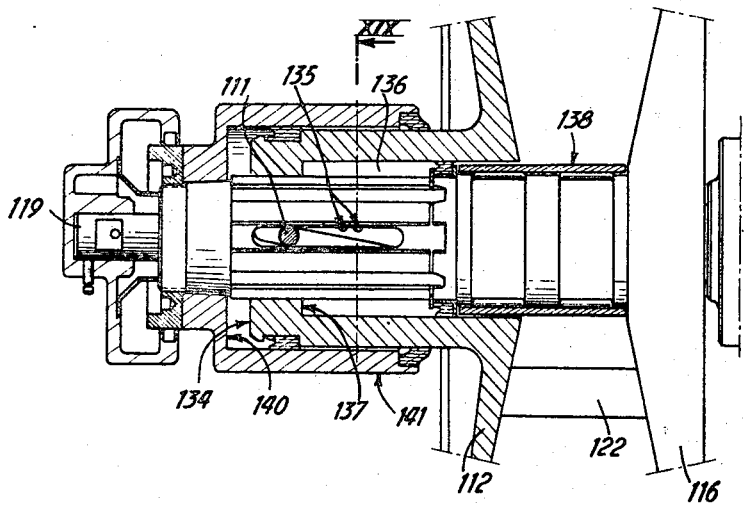

When the slide-valve 119 is drawn back to the maximum extent towards the left as shown in FIGS. 20 and 21, the liquid contained in the cylinder 126 can flow out towards the discharge tank through the port 127, the flat portion 128, the port 123, the annular chamber 125, the port 130, the longitudinal groove 131, the duct 132 and thte collector 133 from which the liquid is directed towards said discharge tank (not shown in the drawings). Said liquid without pressure is forced back by the annular piston of the movable pulley 112 under the thrust exerted by the lateral face of the driving belt 122 which is stretched by the receiving pulley (not shown). When the front rim 134 of the annular piston of the movable pulley 112 masks the slot 114 (as shown in FIGS. 22, 23 and 24) and when, as a result of the rotation of the sleeve 118, the ports 135 are brought opposite to and open into said slot 114 so as to supply the chamber 136 with liquid under pressure, a hydraulic thrust is exerted on the end 137 of the tubular extension of the pulley 112 which forms a cylinder. Said hydraulic thrust is added to the thrust exerted by the lateral face of the driving belt 122 which disappears at the moment when the internal flat portion of the belt winds over the free-motion or idler pulley 138. The thrust exerted by the liquid under pressure contained in the cylinder 136 on the end 137 alone remains and pushes the rim 134 of the movable pulley against the base 140 of the annular cylinder 136 (as shown in FIG. 14). In this position, the distance between the flanges 112 and 116 is greater than the width of the driving belt 122 which can thus wind freely over the idler pulley 138 without any contact between the lateral faces of said belt and said flanges. By being thus brought to bear on the base 140, the flange 112 is trued and maintained in a correct plane of rotation.

The just described embodiment, like those hereinbefore described, includes hence a control pilot valve consisting of a control pilot member and a pilot following member constituted in the present instance by the slide valve-member 119 and the sleeve 118, respectively.

FIGS. 25 and 26 show a form of the speed-changing mechanism herein described which is completed by an auxiliary control which can be engaged or disengaged hydraulically by virtue of the arrangement of controlled elements. It is thus possible either to provide a reverse-motion system which will complete said speed-changing mechanism or an auxiliary control system for actuating a device which is added separately.

With this design in view, provision is made for a suitable extenson of the apparatus so that the flanges 112 and 116 can thus open out to a greater and sufficient extent. The assembled elements, namely the liquid inlet and outlet ports, the servo-system, control and operation remain the same or similar and produce action in the same manner as that which has been indicated above.

The pulley 142 which is integral with the movable flange 112 and over which the driving belt 145 is wound is mounted on roller-bearings between two abutment shoulders 146 and 147 on the exterior 141 of the cylinder 126.

The operation is as follows:

When drawn to the position shown in FIG. 14, the slide-valve 119 determines a position of equilibrium of the movable flange 112 in which said slide-valve isolates the cylinder 126 from the admission of liquid under pressure and from its delivery to the discharge tank, thus leaving a layer of liquid having a width L imprisoned within the cylinder 126. This incompressible liquid resists the thrust exerted by the liquid under pressure which is supplied to the cylinder 136 and which applies pressure to the base 137 shown in FIG. 23.

The distance L is so defined that the spacing of the flanges 112 and 116 is greater than the width of the driving belt 122, thus resulting in its disengagement in a manner which is similar to that previously described. In this position, the flange 144 (as shown in FIG. 25) which is integral with the movable flange 112 is located at a distance from the flange 143 which is greater than the width of the driving belt 145. Said driving belt can thus turn freely without undesirable rubbing against the idler pulley 142.

In this preferential position of the slide-valve 119, the two driving belts 122 and 145 are disengaged. Starting from this position, it is possible either to engage the driving belt 122 by drawing the distributor 119 towards the right or to engage the driving belt 145 by drawing said distributor towards the left. In this latter case, the movable flange 112 moves towards the left and the flange 144 which is integral therewith accordingly applies the belt 145 against the flange 143 as shown in FIG. 26. By drawing the slide-valve 119 towards the left to a further extent than that shown in FIG. 26, namely as shown in FIG. 20, the cylinder 126 is connected to the discharge tank (not shown in the drawings) and the engagement of the driving belt 145 is accordingly effected without stress as a result of the thrust exerted by the liquid under pressure which is supplied to the cylinder 136 and applies pressure to the base 137 of said cylinder.

As an advantageous feature, said driving belt 145 can operate a reverse-motion device which will produce action in such a manner as to reverse the movement of the driven pulley, thereby obtaining a progressive speed change which will produce forward motion, engagement and disengagement and reverse motion as a result of the operation of a hand lever which will move a distributor either from left to right or from right to left.

Said driving belt, or any belts of similar type, will thus serve to control devices which are associated with the speed-changing mechanism hereinabove described.

What I claim is:

1. A self-contained transmission pulley for V-belt transmissions with variable transmission ratio, comprising an axially movable pulley flange and means carried by the pulley and actuatable by liquid under pressure to move said flange axially, said means comprising a control pilot valve for controlling the supply and escape of a liquid under pressure, which valve includes a control pilot member and a pilot following member, and a motion transmitting connection from said axially movable flange and said pilot following member so that the position of the latter and thereby the transmission ratio are determined by the position of said following member, wherein said motion transmitting connection is a motion reducing one, whereby the stroke of said pilot following member is less than the corresponding displacement of the pulley flange.

2. A transmission pulley as claimed in claim 1, wherein said motion transmitting connection includes a stud and helical groove coupling between the movable pulley flange and said pilot following member which is coupled to said cheek.

3. A transmission pulley as in claim 2, further having a fixed flange and wherein said pilot following member is a both rotatable and slidable sleeve in which is slidably fitted said pilot member, said slidable sleeve being coupled to the fixed flange of the pulley by means of a pin and helical groove connection having a pitch opposite to and smaller than that of the helical groove of the coupling between said sleeve and the movable flange.

4. In a speed-changing mechanism including a main pulley for V-belt transmissions with variable transmission ratio, said pulley comprising an axially movable pulley flange, a fixed pulley flange having a hub, and means actuatable by liquid under pressure to move said flange axially, said means comprising a control pilot valve for controlling the supply and escape of a liquid under pressure, which valve includes a control pilot member and a pilot following member, and a motion transmitting connection from said axially movable flange and said pilot following member so that the position of the latter and thereby the transmission ratio are determined by the position of said following member, a second pulley coaxially carried by said main pulley and rotatable therewith.

5. In a speed-changing mechanism as in claim 4, said second pulley being fixed on said hub.

6. A speed-changing mechanism including a main pulley for V-belt transmissions with variable transmission ratio, said pulley comprising an axially movable pulley flange, a fixed pulley flange having a hub, and means actuatable by liquid under pressure to move said flange axially, said means comprising a control pilot valve for controlling the supply and escape of a liquid under pressure, which valve includes a control pilot member and a pilot following member, and a motion transmitting connection from said axially movable flange and said pilot following member so that the position of the latter and thereby the transmission ratio are determined by the position of said following member, wherein said means actuatable by liquid under pressure include inside said hub two variable volume chambers arranged to urge said movable flange in contrary directions in response to an increase of their volume, said means for controlling the supply and escape of a liquid under pressure being arranged selectively to control said supply and escape of said liquid under pressure to and from said chambers.

7. A speed-changing mechanism as in claim 6, wherein said control valve means are arranged to control the fluid supply and escape to and from one of said chambers by that portion of the stroke of the pilot following member extended on one side of a predetermined position of said following member and the fluid supply and escape to and fro the other chamber by a portion of said stroke situated on the other side of said predetermined position.

8. A speed-changing mechanism as in claim 7, wherein the stroke of said pilot member and consequently that of said pilot following member are greater than that corresponding to the stroke of the movable pulley flange to vary the pulley diameter from its maximum to its minimum value, whereby the movable flange may be moved quite out of contact with the belt.

9. A speed-changing mechanism as in claim 6, wherein a second pulley having a V-section groove and a movable flange is carried by said first named or main pulley to rotate therewith and said flange is operatively connected to both said variable volume chambers to be moved in opposite directions in response to an increase of volume of any of said chambers.

10. A speed-changing mechanism as in claim 9, wherein said operative connection is such that an increase of the volume of one of said chambers will move the movable flange of said main pulley to reduce the diameter thereof and will move the movable flange of said second pulley to increase the diameter of the latter and the other chamber will operate contrarily.

11. A speed-changing mechanism as in claim 9, wherein said movable flange of the second pulley is carried by said movable flange of the main pulley.

12. A speed-changing mechanism as in claim 9, wherein the other flange of said second pulley is loosely rotatable on the main pulley and said movable flange of the second pulley is rotatingly connected with the main pulley.

13. A speed-changing mechanism as in claim 4, wherein said second pulley has a V-section groove and an axially movable flange connected at least as to its axial motion with the axially movable flange of the main pulley to be moved bodily therewith.

14. A speed-changing mechanism as in claim 10, wherein the possible stroke of said pilot member and consequently that of the pilot following member are at least equal to that corresponding to the sum of the strokes of each movable flange to vary the diameter of the relevant pulley from the minimum to the maximum value, so that said diameters may have simultaneously their minimum value.

15. A speed-changing mechanism as in claim 10, wherein the possible stroke of said pilot member and consequently that of the pilot following member are greater than that corresponding to the sum of the strokes of each movable flange to vary the diameter of the relevant pulley from the minimum to the maximum value, so that said diameters may have simultaneously their minimum value, the extra-length of said stroke being a dead stroke portion during which said diameters remain unvaried at the said minimum value, said dead stroke portion being extended between two stroke portions, one for the control of one of said chambers and the other for the control of the other chamber.

16. A speed-changing mechanism as in claim 14, further including a driven shaft and motion transmission means between each of said main and second pulleys and said driven shaft and such that said shaft may be driven by one pulley in one direction and by the other in the opposite direction.

17. A speed-changing mechanism as in claim 15, wherein said control valve means are so designed that during said dead stroke portion liquid remains trapped in that chamber, an increase of the volume of which causes an increase of the diameter of the main pulley and the other chamber is connected to discharge.

References Cited

UNITED STATES PATENTS

| | | | |
|---|---|---|---|
| 3,014,378 | 12/1961 | Bruet | 74—230.17 |
| 3,081,642 | 3/1963 | Emerson | 74—230.17 |
| 3,146,633 | 9/1964 | Schmitter et al. | 74—230.17 |
| 3,280,649 | 10/1966 | Bruet | 74—230.17 |

C. J. HUSAR, *Primary Examiner.*